United States Patent
Artiuch et al.

(10) Patent No.: US 7,299,139 B2
(45) Date of Patent: Nov. 20, 2007

(54) MEASURING GAS METER AND VOLUME CORRECTOR ACCURACY

(75) Inventors: Roman Leon Artiuch, Houston, TX (US); Charles Grissom Steele, Richmond, TX (US); Miguel D. Gandara, Webster, TX (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 11/274,470

(22) Filed: Nov. 15, 2005

(65) Prior Publication Data

US 2007/0112536 A1    May 17, 2007

(51) Int. Cl.
  G01F 1/00    (2006.01)
  G01F 7/00    (2006.01)
  G01F 1/12    (2006.01)
  G01F 1/50    (2006.01)
  G01F 25/00   (2006.01)

(52) U.S. Cl. ........................... 702/45; 702/100
(58) Field of Classification Search .......... 702/45, 702/50, 100; 73/1.16, 19.04, 861.02, 861.04
See application file for complete search history.

(56) References Cited

U.S. PATENT DOCUMENTS 5,455,781 A * 10/1995 Reynal et al. ............ 702/82
7,212,953 B1 * 5/2007 Artiuch ..................... 702/183

OTHER PUBLICATIONS

Mini-Max®, Mini-Max®-AT, Mini-Max®-ATX Product Brochure [online]. Mercury Instruments, Inc. [retrieved on Oct. 27, 2005]. Retrieved from the Internet: <URL: www.mercuryinstruments.com> Believed to have been publicly available before Nov. 15, 2005.
RPM Series Rotary Meters Ten-Cycle Proving with RPM-ETC. IM 5770. 1 Installation Operation Maintenance. American Meter Company. Believed to have been publicly available before Nov. 15, 2005.
"ROOTS Meter with Integral Micro Corrector Model IMC/C," Dresser Measurement, Rev. Aug. 2001.

* cited by examiner

Primary Examiner—Michael Nghiem
(74) Attorney, Agent, or Firm—Fish & Richardson P.C.

(57) ABSTRACT

Systems, apparatus, methods, and computer program products relate to measuring the combined accuracy of a gas meter and a volume corrector as a system. The measurement is performed with a transfer prover, and may be performed automatically on either integrated or non-integrated volume correctors and meters. In one embodiment, a test interface provides a convenient connection with controllable data switches for routing information between the meter/volume corrector, the transfer prover, and a processing device. Software running on the processing device can automatically configure the parameters for performing a combined accuracy test by downloading parameters from the meter/corrector and transfer prover via the test interface. Upon user selection of the test type, and optionally flow rates, for running the test, the software may configure data switches on the test interface to automatically perform the selected combined accuracy test.

20 Claims, 13 Drawing Sheets

Meter Test

Field Meter Pressure inch: 0.0387
Field Meter Diff. inch: 0.6718
Test Volume cf: 16.80
Field Meter Temp. °F: 70.02
— 434

Master Pressure inch: -1.1408
Master Differential inch: 0.7199
Master Volume cf: 17.12
Master Meter Temp. °F: 70.32
— 432

Ambient Pressure psia: 14.59
Master Flow acfh: 1996.91
Est. Test Time sec: 0

● Temp Stable
○ Test Run Started
● Test Run Completed

% Uncorrected Proof: 102.23
% Corrected Proof: 99.95
% Temp. Corr.: -1.95
% Pres. Corr.: -0.29
% Accuracy: 100.05
% Error: 0.05
— 436

Test Pass ●
Test Fail ○

Test Flows: 2000.0 ▶  2 ▶

Viewing Test 2: Flow Rate 2000.0: Repeat No. 1
◀ ▶
Viewing The Test Results...

View Report
Exit Test
Restart Test
Stop Test
— 438
— 430

FIG. 4D

DMD Model 5 Prover
Date: 11/5/2005

⌐ 440

| | |
|---|---|
| Name: | Dresser, Inc |
| Location: | Houston |
| Operator's Name or ID: | ROMAN |
| Master Meter Type: | 2M(2300cfh/56.6m3) |
| Master Serial #: | 9790093 |
| Meter Output: | (PCTC) Pressure Corrected and Temperature Corrected |
| Field Meter Type: | IMC/W2 VER 1.83 2M |
| Field Meter Serial #: | 128277 |
| Test Setup: | PTZ - PROV TEST |
| Comments: | |
| COMMENT1 | |
| COMMENT2 | |
| COMMENT3 | |
| Span Test Result: | PASS,+/- 1.50 |

Test Completed:

| | 17:43:42 | 17:44:25 |
|---|---|---|
| Flow Rate: (acfh) | 1998.868 | 1996.911 |
| Test Volume: (cf) | 16.795 | 16.795 |
| Drive Rate or Pulses/Test: | 51.000 | 51.000 |
| Ambient Pressure: (psia) | 14.585 | 14.585 |
| Master Temperature: (°F) | 70.316 | 70.316 |
| Master Pressure: (inch) | -1.148 | -1.141 |
| Master Differential: (inch) | 0.719 | 0.720 |
| Master Volume: (cf) | 17.139 | 17.116 |
| Meter Temperature: (°F) | 70.105 | 70.018 |
| Meter Pressure: (inch) | 0.040 | 0.039 |
| Meter Differential: (inch) | 0.676 | 0.672 |
| Test Duration: | 00:00.31 | 00:00.31 |
| Upper Pass/Fail Limit: | 1.000 | 1.000 |
| Lower Pass/Fail Limit: | 1.000 | 1.000 |
| % Pressure Correction: | -0.294 | -0.292 |
| % Temp. Correction: | -1.946 | -1.946 |
| % Uncorrected Proof: | 102.365 | 102.230 |
| % Corrected Proof: | 100.077 | 99.947 |
| % Accuracy: | 99.923 | 100.053 |
| % Error: | -0.077 | 0.053 |
| Single Test Result: | Pass | Pass |

FIG. 4E

Calculation of Number of Test Pulses and Test Volume

**Number of Test Pulses = PPT = A * INT{[(MTT * FR * C) / (3600 * PO * A)] + 1}**

**Test Volume = (PPT * PO) / C**

Where:
FR = Flow Rate [Volume Units / Hour]
C = Correction Factor (This value is a combination of pressure, temperature and supercompressibility factors. Equations for this factor calculation are commonly known.)
if UT <= 0.3 then MTT = Recommended Minimum Test Time for Transfer Prover (e.g. 30 [s])
if UT > 0.3 then MTT = UT / a [s]
a = Arbitrary Number (e.g. a Number Between 0.001 and 0.01)
UT =
PO = Pulse Output [Volume Units]
DR = Drive Rate [Volume Units]
UT, PO, and A are dependent on the type of corrector and meter output as described below.

1. Integrated Corrector and High Frequency Meter Output
UT < 0.3
C = 1
A = 1
PO = value dependent on meter type and size
e.g. PO = 1 / (volume / revolution of impellers) [1 / volume units]

2. Integrated Corrector and Uncorrected Meter Output
UT = Constant (e.g. UT = 2)
C = 1
A = 1
PO = Uncorrected Output Pulse [Volume Units]

3. Integrated Corrector and Uncorrected Proving Mode Meter Output
UT < 0.3
C = 1, A = 1
PO = Uncorrected Output Pulse in Proving Mode [Volume Units]

4. Integrated Corrector and Corrected Meter Output
UT = Constant (e.g. UT = 2)
C = Correction Factor [Positive Number]
A = 1
PO = Corrected Output Pulse [Volume Units]

5. Integrated Corrector and Corrected Proving Mode Meter Output
UT < 0.3
C = Correction Factor [Positive Number]
A = 1
PO = Corrected Output Pulse in Proving Mode [Volume Units]

6. Non-Integrated Corrector and Uncorrected Meter Output
if (DR / PO) <= 1 then UT = Constant and A = 1 (e.g. UT = 2)
if (DR / PO) > 1 then UT = Constant and A = DR (e.g. UT = 2 + (DR / PO) * 0.63)
C = 1
PO = Uncorrected Output Pulse [Volume Units]

7. Non-Integrated Corrector and Corrected Meter Output
if (DR / PO) <= 1 then UT = Constant and A = 1 (e.g. UT = (DR / PO) * C)
if (DR / PO) > 1 then UT = Constant and A = DR (e.g. UT = (DR / PO) * C)
C = Correction Factor [Positive Number]
PO = Corrected Output Pulse [volume units]

Validity Check of Parameters to Determine if the Test may be Performed

Condition for Pulse Output (PO)

**PO > (FR * C * PW) / 3600**

Where:
FR = Flow Rate [Volume Units / Hour]
C = Correction Factor (This value is a combination of pressure, temperature and supercompressibility factors. Equations for this factor calculation are commonly known.)
PW = Pulse Width [s]

1. Integrated Corrector and Uncorrected Meter Output
C = 1
PO = Uncorrected Output Pulse [Volume Units]
PW = Constant (e.g. 0.4 [s])

2. Integrated Corrector and Uncorrected Proving Mode Meter Output
C = 1
PO = Uncorrected Output Pulse in Proving Mode [Volume Units]
PW = Constant (e.g. 0.02 [s])

3. Integrated Corrector and Corrected Meter Output
C = Correction Factor [Positive Number]
PO = Corrected Output Pulse [Volume Units]
PW = Constant (e.g. 0.4 [s])

4. Integrated Corrector and Corrected Proving Mode Meter Output
C = Correction Factor [Positive Number]
PO = Corrected Output Pulse in Proving Mode [Volume Units]
PW = Constant (e.g. 0.02 [s])

5. Non-Integrated Corrector and Uncorrected Meter Output
Check only if DR/PO > 1
C = 1
DR = Drive Rate [Volume Units]
PO = Uncorrected Output Pulse [Volume Units]
PW = Constant (e.g. 0.63 [s])

6. Non-Integrated Corrector and Corrected Meter Output
Check only if DR/PO > 1
C = Correction Factor [Positive Number]
DR = Drive rate [Volume Units]
PO = Corrected Output Pulse [Volume Units]
PW = Constant (e.g. 0.63 [s])

Condition for Drive Rate (DR)

**DR > (FR * C * PW) / 3600**

Where:
FR = Flow Rate [Volume Units / Hour]
C = Correction Factor (This value is a combination of pressure, temperature and supercompressibility factors. Equations for this factor calculation are commonly known.)
PW = Pulse Width [s] = Constant (e.g. 0.63 [ms])

FIG. 6B

MEASURING GAS METER AND VOLUME CORRECTOR ACCURACY

TECHNICAL FIELD

Various embodiments may relate generally to measuring accuracy, and particular embodiments may relate to methods and systems for measuring accuracy of gas meters and volume correctors.

INTRODUCTION

Fluids, such as natural gas, may be transported, distributed, and sold to end-users through distribution systems. For example, a gas-fired furnace of an apartment complex may receive natural gas through a gas line. The gas consumption by end users varies over time. For residential users, for example, demand may typically decrease during summer, and increase through the winter.

To measure the amount of gas consumed by a user, a gas meter may be installed on the gas line. One type of gas meter is a rotary gas meter. Gas flowing through the meter to the end-user appliance causes an impeller to rotate. Each rotation of the impeller corresponds to a certain amount of gas passing through the meter, the precise amount being dependent on factors such as the line pressure, flow rate, temperature, etc. As such, rotation of the impeller may be monitored to determine the amount of gas that is passing through the meter and being consumed by the customer.

Gas is typically sold by price per volume, e.g., dollars per 1000 cubic feet. Accurate gas billing, as well as other functions, may depend largely on accurate gas metering. To refine their accuracy, some meters have volume correctors to adjust the output of the gas meter to produce a more accurate measurement. Much like a gear, a volume corrector may adjust the output of a meter by, for example, a fixed ratio, such as 1003:1000. As another example, a volume corrector may adjust a gas meter output by +/−0.07%, depending on the particular meter and its installation.

Where volume correctors are used, functions such as billing may rely on the combined accuracy of both the meter and the volume corrector. The accuracy of a gas meter alone can be checked using a transfer prover. The accuracy of a volume corrector can be separately checked by a dedicated measuring device.

SUMMARY

Systems and associated apparatus, methods, and computer program products, relate to measuring the combined accuracy of a gas meter and a volume corrector as a system. The measurement is performed with a transfer prover, and may be performed automatically on either integrated or non-integrated volume correctors and meters. In one embodiment, a test interface provides a convenient connection with controllable data switches for routing information between the meter/volume corrector, the transfer prover, and a processing device. Software running on the processing device can automatically configure the parameters for performing a combined accuracy test by downloading parameters from the meter/corrector and transfer prover via the test interface. Upon user selection of the test type, and optionally flow rates, for running the test, the software may configure data switches on the test interface to automatically perform the selected combined accuracy test.

Some embodiments may provide one or more advantages. For example, accuracy testing of the combined meter and volume corrector can lead to a single, accurate test of the entire metering system. Automated parameter determination for a selected test type may reduce labor, requirements for specialized user training, and avoid manual computation errors. Some embodiments may be configured to perform a test that minimizes test time substantially, in some cases from one or two hours down to between about 30 to 60 seconds. As such, some embodiments may yield time savings, including reduced off-line time for meter testing, and/or labor and opportunity cost savings, while decreasing opportunities for test configuration errors and improving accuracy for the combined meter and volume corrector measurement system.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4D shows an exemplary GUI that presents results of the gas meter and corrector test to the user.

FIG. 4E shows the test results in an exemplary report format.

FIG. 6A shows exemplary equations for calculating a number of test pulses and a test volume for different test types.

FIG. 6B shows exemplary equations for validating the pulse output and the drive rate for the different test types.

Like reference symbols in the various drawings indicate like elements.

DETAILED DESCRIPTION

Figure 1A:
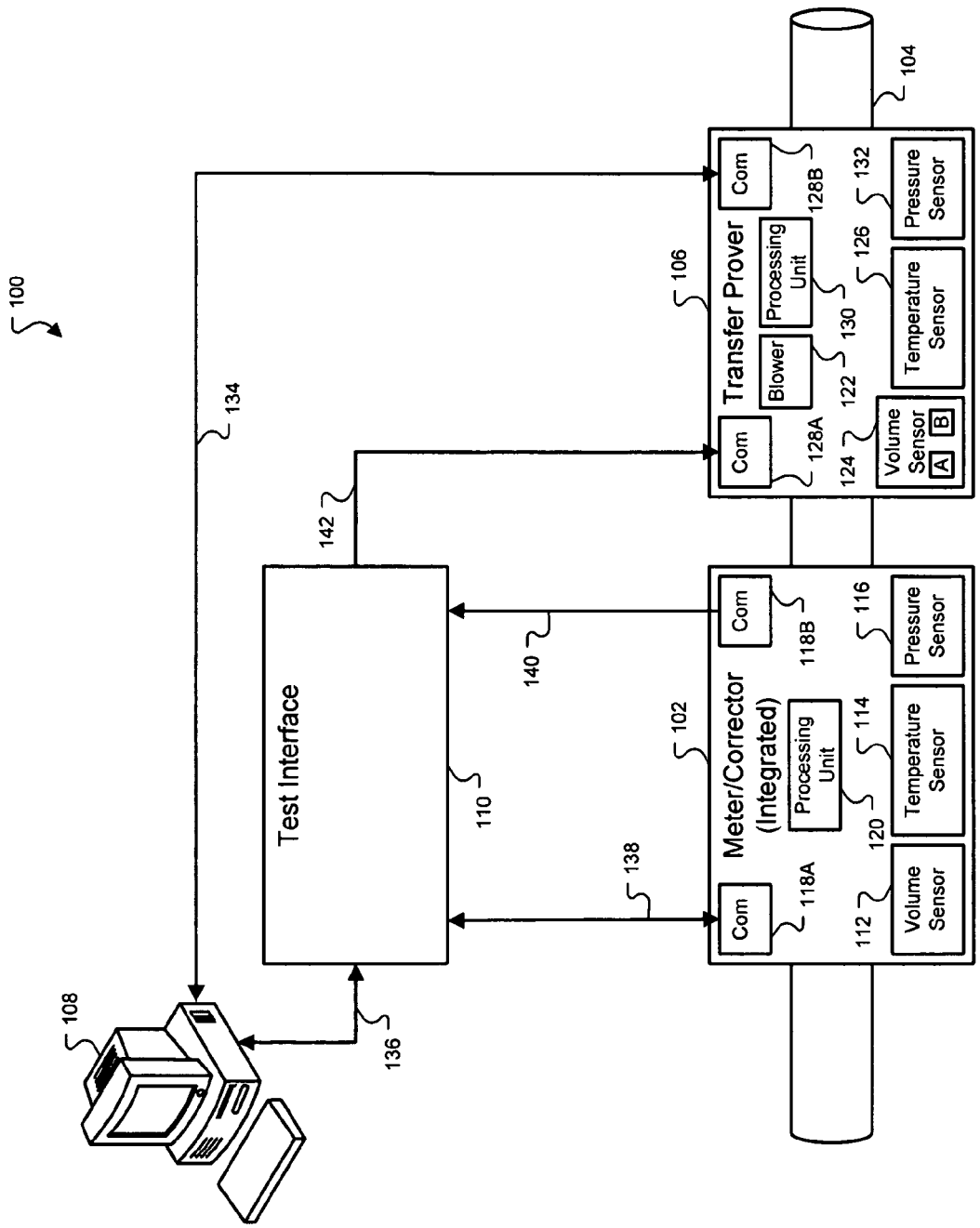
FIG. 1A shows an exemplary setup for determining the accuracy of an integrated gas meter and corrector in a laboratory environment.

FIG. 1A shows an exemplary test setup 100 for determining the accuracy of an integrated gas meter and corrector in a laboratory environment. The setup 100 includes an integrated gas meter and corrector 102 configured for testing to determine if the integrated meter/corrector 102, combined as a whole, accurately measures the volume of a gas that is passed through a line 104. In the test setup 100, a gas, such as air, flows through the line 104. A transfer prover 106 drives the test air flow along the line 104 using a blower. The transfer prover 106 also provides a reference volume measurement that may be compared to the measurement from the meter/corrector 102 to determine the accuracy of the meter/corrector 102.

In this example, some or all of the steps of the test may be performed under the control and/or monitoring of a computer device 108, such a portable (e.g., handheld, laptop, etc . . . ) computer in some embodiments. The computer device 108 is in communication with a test interface 110. The test interface 110 routes control and data signals between the computer device 108 and the meter/corrector 102. In addition, the test interface 110 routes data signals from the meter/corrector 102 to the transfer prover 106.

In this example, the meter/corrector 102 includes a volume sensor 112, a temperature sensor 114, a pressure sensor 116, and communication interfaces 118A-B. In some implementations, the meter/corrector 102 includes a processing unit 120. The meter/corrector 102 measures the volume of air flowing through the line 104 using the volume sensor 112. The flow of air may cause an impeller (not shown) within the meter/corrector 102 to turn. Each turn of the impeller causes the meter/corrector 102 to generate a number of output pulses. The meter/corrector sends the output pulse information over the output pulse communication interface 118B. In some implementations, the meter/corrector 102 may also send the output pulses over the serial communication and control interface 118A.

The meter/corrector 102 has, in addition to the volume sensing functionality, correction functionality to correct the volume measurement based on the temperature and/or pressure within the line 104. In some embodiments, the temperature sensor 114 and/or the pressure sensor 116 may measure the temperature and pressure, respectively, within the line 104. In other implementations, sensors for temperature and/or pressure may be configured to sense temperature external to the gas line 104. For example, a temperature sensor may be placed in a temperature bath to simulate a temperature condition at the bath temperature. The meter/corrector 102 may use the temperature and/or pressure measurements to adjust the number of output pulses according to correction algorithms. The corrected output pulses may then be sent over the COM interfaces 118A-B. In this example, the correction operation may be performed by the processing unit 120. The processing unit 120 may include digital and/or analog circuitry, and may include programmable devices containing executable instructions (i.e. software). The meter/corrector 102 may be configured to output several different formats over the COM interfaces 118A-B, such as, corrected pulses, uncorrected pulses, corrected pulses in proving mode, and uncorrected pulses in proving mode. The meter/corrector 102 may also output high frequency pulses over the COM interface 118A. These formats will be described in further detail with reference to FIG. 2.

The transfer prover 106 includes a blower 122, a volume sensor 124, a temperature sensor 126, and COM interfaces 128A-B. The volume sensor 124 may include one or more meters that may be referred to as master meters. In some implementations, the transfer prover 106 may also include a processing unit 130 and/or a pressure sensor 132. The transfer prover 106 provides the test air flow using the blower 122. The transfer prover 106 measures the reference volume by monitoring the volume sensor 124. The transfer prover 106 may correct the reference volume measurement based on measurements from the temperature sensor 126 and/or the pressure sensor 132. In some examples, the pressure and/or temperature may be sensed external to the transfer prover. The transfer prover 106 may receive output pulses from the meter/corrector 102 via the COM interface 128A, which is connected to the test interface 110. The transfer prover 106 may process, store, transmit, or compare the output pulses. When the number of output pulses from the meter/corrector 102 matches the test flow volume, the transfer prover 106 may send the results of the test, such as the reference volume measurement and an error between the reference volume and the test volume, to the computer device 108 via the COM interface 128B.

Some transfer provers may include two or more volume sensors (i.e., volume meters or "master meters"). Different sized volume meters, for example, may provide for accurate measurements over different ranges of flow rates. In this example, the transfer prover 106 includes two volume meters, a meter A and a meter B, which may have different flow rate capacities. Combined accuracy testing of meter/correctors may involve selecting the appropriate sized volume meter A,B based on the flow rate used for the accuracy test.

Using the test interface 110, software running on the computer device 108 may control the flow of communication to and from the computer device 108 and the meter/corrector 102. The software may also control the flow of output pulse signals from the meter/corrector 102 to the transfer prover 106, using the test interface 110. In one embodiment, software running on the computer device 108 may calculate the required number of test output pulses to be received from the meter/corrector 102 and the equivalent test volume. After temperature and pressure conditions within the line 104 substantially stabilize, the transfer prover 106 may start measuring the reference volume according to the output pulses received from the meter/corrector 102. The transfer prover 106 counts the output pulses. When it receives the required number of test output pulses, the transfer prover 106 may determine the reference volume measured by the volume sensor 124.

For example, the computer device 108 may receive configuration parameters from the transfer prover 106, such as the size of the selected master meter A, B within the transfer prover 106, and pressure and/or temperature values in various places in the transfer prover 106, via a data link 134. The computer device 108 may send a control signal via link 136 to the test interface 110 instructing the test interface 110 to route communications between the computer device 108 and the COM interface 118A of the meter/corrector 102. The test interface 110 may operate one or more switches (e.g. multiplexers) to route the communications. The computer device 108 may receive configuration parameters from the meter/corrector 102, via the link 136 and a link 138. The parameters from the meter/corrector 102 may include information, such as a size of the meter, a type of the meter, a current configured test type, an indication of whether temperature correction will occur, an indication of whether pressure correction will occur, a current temperature measurement, and/or a current pressure measurement, for example. The computer device 108 may use parameters loaded from the transfer prover 106, the meter/corrector 102, and parameters specified by a user to validate and/or prepare to perform an accuracy test of the meter/corrector 102.

In some examples, the computer device 108 may notify the user if the parameters for the test are invalid. For example, some types of output pulses may have a fixed pulse width, which may be expressed as a length of time (e.g. 100 milliseconds). As the rate of flow increases through the line 104, the time between pulses may decrease. If the time between the start of each pulse is substantially equal to or less than the width of a pulse, then the pulses may overlap and become indistinguishable from one another. Accordingly, software running within the computer device 108 may check for the likelihood of this to occur in order to determine whether, for example, a selected test flow rate is valid. In some embodiments, the check may be determined based, at least in part, on parameters, such as the pulse output limits of the volume sensor 112 and the volume sensor 124. If the selected flow rate is high enough that the pulses from either of the volume sensors 112 and 124 will overlap, then the test parameters may be deemed invalid and the user may be notified.

After determining that the test parameters are valid, the computer device 108 may initiate the gas meter and volume corrector accuracy test. In one implementation of the gas meter and volume corrector accuracy test, the computer device 108 sends a control signal to the test interface 110 to instruct the test interface 110 to route a particular output pulse type from the meter/corrector 102 to the transfer prover 106 via the link 136. The test interface 110 may receive output pulse information from the meter/corrector 102 via the link 138 and/or a link 140. The test interface 110 may pass the pulse information to the transfer prover 106 via link 142 and COM interface 128A. The computer device 108 may initiate the gas meter and volume corrector accuracy test by sending information representing a calculated number of test pulses to the transfer prover 106, and signaling the transfer prover 106 to start the blower 122. The transfer prover 106 may then measure reference pulses using the volume sensor 124 until the transfer prover 106 receives the calculated number of test pulses from the meter/corrector 102 through the test interface 110. The calculated number of test pulses indicates that the meter/corrector 102 has measured the desired test volume. The transfer prover 106 sends the measured reference volume to the computer device 108, as indicated by the data link 134.

An error may be calculated between the test volume measured by the meter/corrector 102 and the reference volume measured by the transfer prover 106. A test may be repeated and the results averaged to obtain a reliable test result. The test may be repeated one or more times at one or more flow rates to determine whether the meter/corrector 102 is accurate over a range of operating conditions, for example. In addition, one or more types of tests may be performed. For example, if the uncorrected pulses of the volume sensor 112 differ from the uncorrected pulses from the volume sensor 124, over some threshold, then an error may be found in the volume metering element of the meter/corrector 102. For another example, if the uncorrected pulses match and the corrected pulses differ, then the error may be due to the temperature and pressure correction elements of the meter/corrector 102.

Figure 1B:
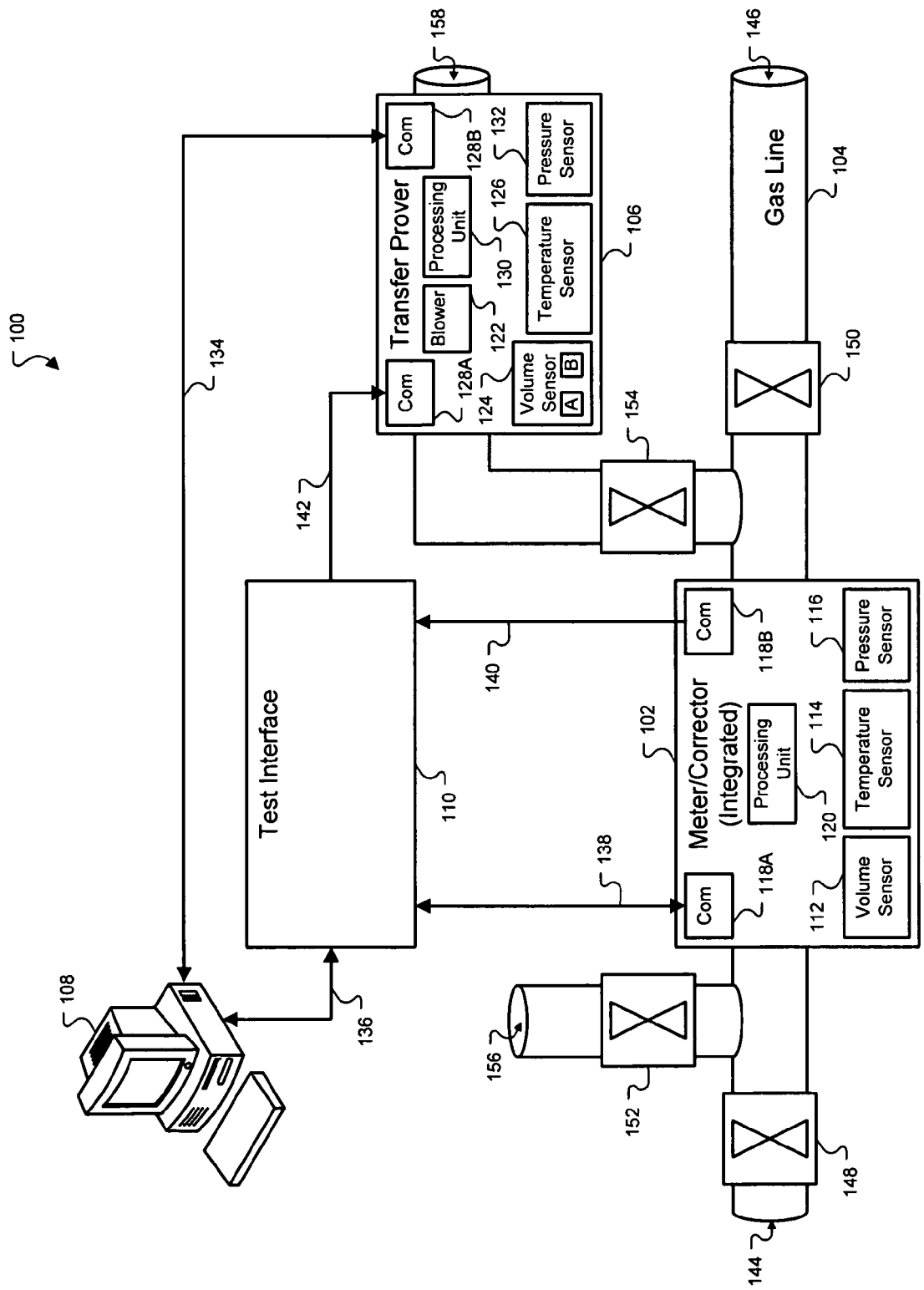
FIG. 1B shows an exemplary setup for determining the accuracy of an integrated gas meter and corrector in a field environment.

FIG. 1B shows the exemplary test setup 100 for determining the accuracy of an integrated gas meter and corrector in a field environment. In this example, the line 104 may be designed to transport gas, for example, from an upstream portion 144 to a downstream portion 146. Generally, the purpose of the meter/corrector 102 is to measure the volume of gas flowing through the line 104. When the meter/corrector 102 is tested in the field environment, in line valves 148 and 150 may be closed to isolate the meter/corrector 102 from the rest of the line 104. Bypass valves 152 and 154 may be opened to connect the transfer prover 106 to the meter/corrector 102 and to provide for airflow during the test. During the test, the blower 122 causes air to flow from the bypass valve 152, through the meter/corrector 102, the bypass valve 156, and the transfer prover 106. In the implementation shown here, the bypass line at 156, 158 are open to atmospheric pressure. In some implementations, portions of the bypassed line may be closed or restricted to generate line pressures substantially above ambient air pressure. The operations for testing the meter/corrector 102 may be the same as those described above with reference to FIG. 1A.

Figure 1C:
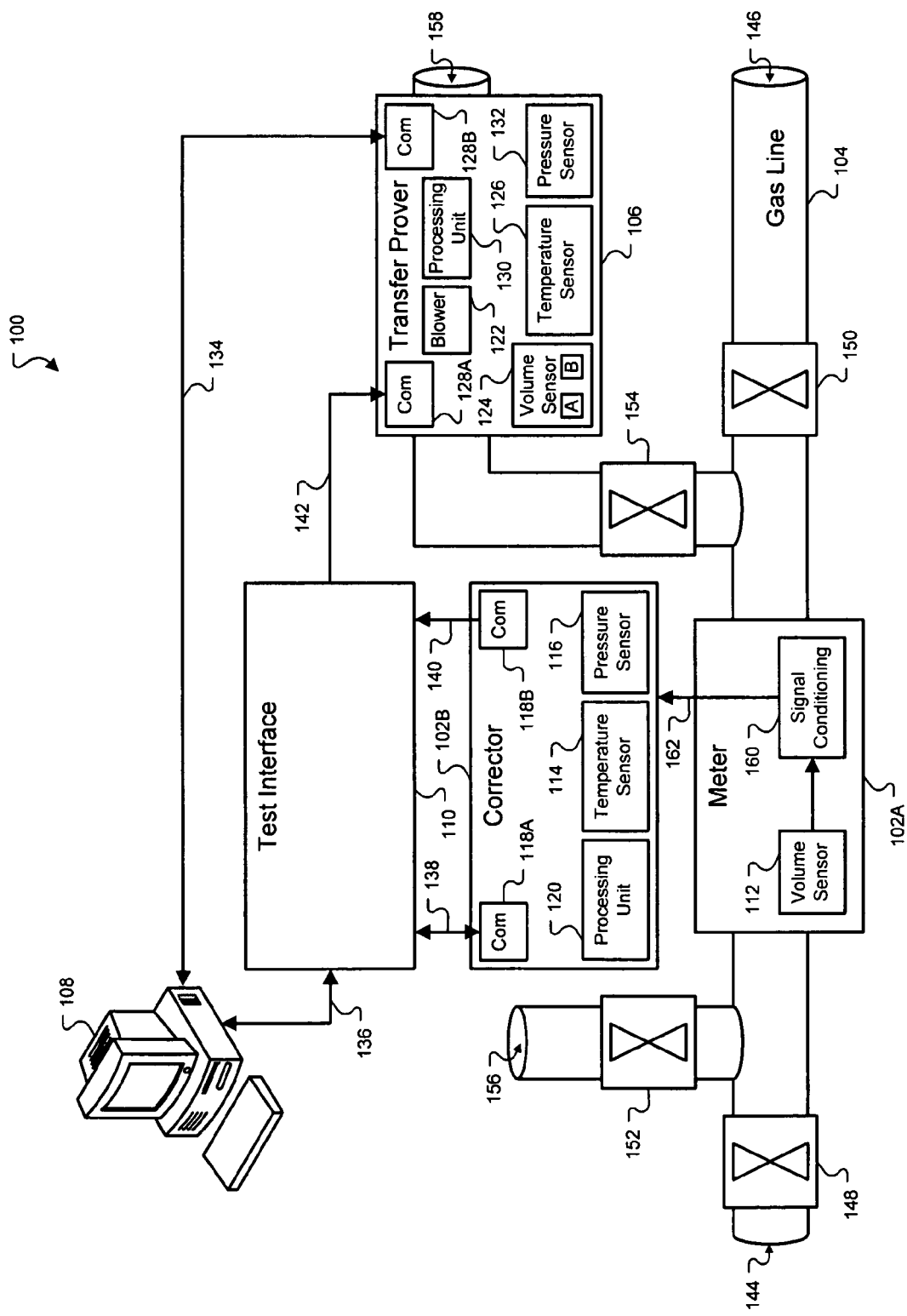
FIG. 1C shows an exemplary setup for determining the accuracy of a separate gas meter and corrector in a field environment.

FIGS. 1B-1C illustrate integrated volume correctors and meters. In a typical integrated meter, pulses may be generated based directly on the rotation of the impeller in the meter, e.g., one pulse per revolution. Such high frequency (HF) pulses may provide a high resolution. Another type of meter is a standard or non-integrated volume corrector and meter. In some embodiments of non-integrated systems, the pulse output from the volume sensor may be conditioned to generate a signal to the volume corrector at a rate corresponding to volume of gas through the meter. For example, a standard meter may send a pulse to a separate volume corrector once for every 10 cubic feet of gas that flows through the meter.

FIG. 1C shows another exemplary setup 100 for determining the accuracy of a standard (i.e., non-integrated) gas meter and corrector in a field environment. Here, the gas meter 102A and the corrector 102B are separate. The volume sensor 112 in the gas meter 102A sends its output signal, which may be a pulse, to a signal conditioning device 160. The signal conditioning device 160 prepares the pulses for transmission to the corrector 102B via the link 162. The corrector 102B may modify the pulses based on the temperature and pressure, and may output the modified pulses through the COM interfaces 118A and/or 118B. In the test setup 100 with the standard gas meter and corrector, the high frequency (HF) output from the corrector 102B may or may not be available. The high frequency output of the corrector 102B requires that the corrector 102B have access to the impeller within the volume sensor 112. The corrector 102B may output corrected pulses, uncorrected pulses, corrected pulses in proving mode, or uncorrected pulses in proving mode. The operations for testing the gas meter 102A and corrector 102B may be the same as those described above with reference to FIG. 1A. The test setup 100 may determine if an error produced by the test is due to the gas meter 102A or the corrector 102B. In addition, the setup 100 shown allows for the determination of an error introduced by the interface between the gas meter 102A and the corrector 102B via the link 162.

Figure 2:
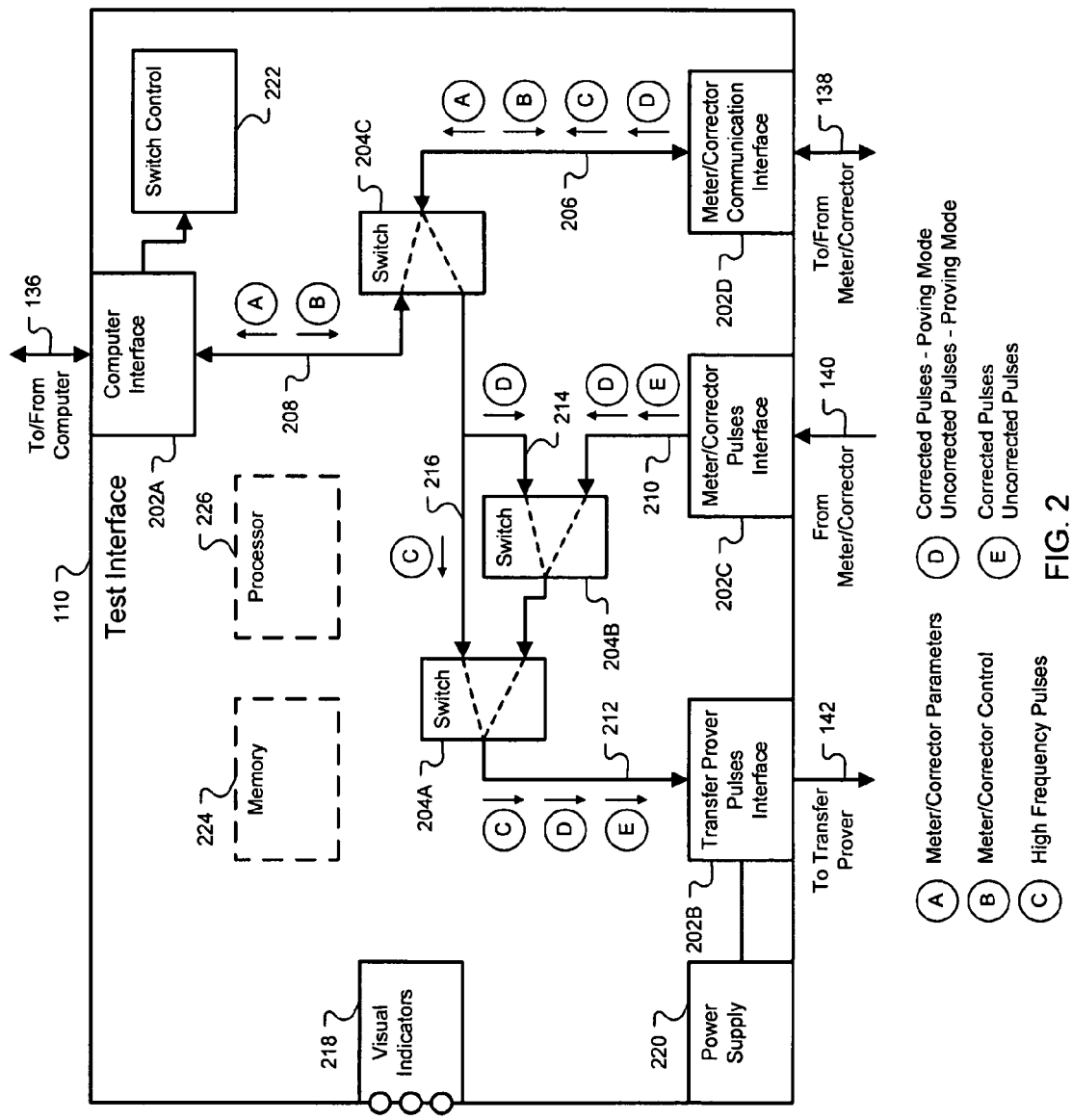
FIG. 2 shows an exemplary implementation of a test interface for communicating with a gas meter and corrector during a test.

FIG. 2 shows an exemplary implementation of the test interface 110. The test interface 110 may route communication between the meter/corrector 102 and the computer device 108. The meter/corrector 102 may be an integrated gas meter and corrector or a standard gas meter and corrector. The meter/corrector 102 includes the gas meter 102A and the corrector 102B. The test interface 110 may also route pulse outputs from the meter/corrector 102 to the transfer prover 106. To accomplish the routing, the test interface 110 includes switches that may be controlled by software running on the computer device 108, for example.

The test interface 110 of this example includes an interface 202A to the computer device 108, an interface 202B to the transfer prover 106, an interface 202C to the pulse output of the meter/corrector 102, and an interface 202D to the communications interface of the meter/corrector 102. The interfaces 202A-D may be wireless, such as infrared (IR) and radio frequency (RF), wired, such as fiber optic cable or electrical cable, or a combination of wireless and wired connections. In some embodiments, one or more of the interfaces 202A-D may use custom or standard protocols, such as Bluetooth, RS-232, Universal Serial Bus (USB), and Transmission Control Protocol/Internet Protocol (TCP/IP), for example. The test interface 110 includes switches 204A-C that route communication between the interfaces 202A-D.

Before performing a gas meter and volume corrector accuracy test, the test interface 110 may be used to perform test preparation operations. For example, during the test preparation operations, the switch 204C may connect the computer device 108 to the communications interface of the meter/corrector 102. This allows the meter/corrector 102 to send its configuration parameters (A) to the computer device 108 via data paths 206 and 208. This also allows the computer device 108 to transmit signals (B) to control the meter/corrector 102, such as by selecting a pulse type for the meter/corrector 102 to output during the test. During the test execution, the switches 204A-C may be set to direct a particular output pulse type to the transfer prover 106. For example, the test interface 110 may direct corrected and/or uncorrected pulses (E) from the interface 202C to the transfer prover 106 via data paths 210 and 212. The test interface 110 may direct corrected and/or uncorrected pulses in proving mode (D) to the transfer prover 106. Here, there are two possible sources of corrected and uncorrected pulses in proving mode (D). The corrected and uncorrected pulses in proving mode (D) may be routed from the interface 202D and through the switches 204C, 204B, and 204A via data paths 206, 214, and 212, or from interface 202C through the switches 204B and 204A via data paths 210 and 212. The test interface 110 may route high frequency pulses (C) to the transfer prover 106 via data paths 206, 216, and 212, through the switches 204C and 204A.

In general, the volume sensor 112 may, with some conditioning, produce an uncorrected pulse output. Each pulse may correspond to some volume that has flowed through the meter.

Another output pulse format available from the corrector is the high frequency pulse output. In integrated meter and corrector systems, the corrector may bypass the uncorrected pulse output from the meter and directly detect rotation of an impeller within the meter to form the high frequency output. The direct detection may be measured in smaller increments of impeller rotation than the uncorrected pulses, producing a higher frequency of pulses. High frequency pulses may undergo processing (not shown) to scale the number of pulses to an equivalent of the corrected and uncorrected pulses. The high frequency pulse output may provide higher precision than the uncorrected and corrected pulse outputs.

If a meter/corrector fails an accuracy test based on the high frequency output format, then one possible cause of the failure may be found in the meter. If a meter/corrector passes an accuracy test based on the high frequency pulse output format, but the same system fails an accuracy test based on the uncorrected pulse output, then one possible cause of the failure may be found in an interface between the meter and the corrector. If a meter/corrector passes an accuracy test based on the uncorrected pulse output format, but the same system fails an accuracy test based on the corrected pulse output format, then one possible cause of the failure may be found in the corrector. In another example, more than one test type may fail, which may indicate that more than one component of the meter/corrector 102 has failed.

Visual indicators 218 on the test interface 110 may display information about, for example, which of the output pulse formats is currently selected, uncorrected, corrected, or high frequency. The visual indicators 218 may also indicate the status of a power supply.

The test interface 110 also includes a power supply 220. Here, the power supply 220 may draw power from the interface 202B connected to the transfer prover 106. In some implementations, the power supply 220 receives its power from some other external source, such as an alternating current source (e.g. 50/60 Hertz). In other implementations, the power supply 220 may receive its power from an internal source, such as a battery or a solar cell. The computer device 108 is in communication with a switch control 222 that is capable of operating the switches 204A-C.

In some implementations, the test interface 110 includes a memory 224 and a processor 226. The memory 224 and the processor 226 may replace some or all of the actions performed by the computer device 108, such as controlling the switches 204A-C or activating the transfer prover 106 and/or processing test results.

Figure 3:
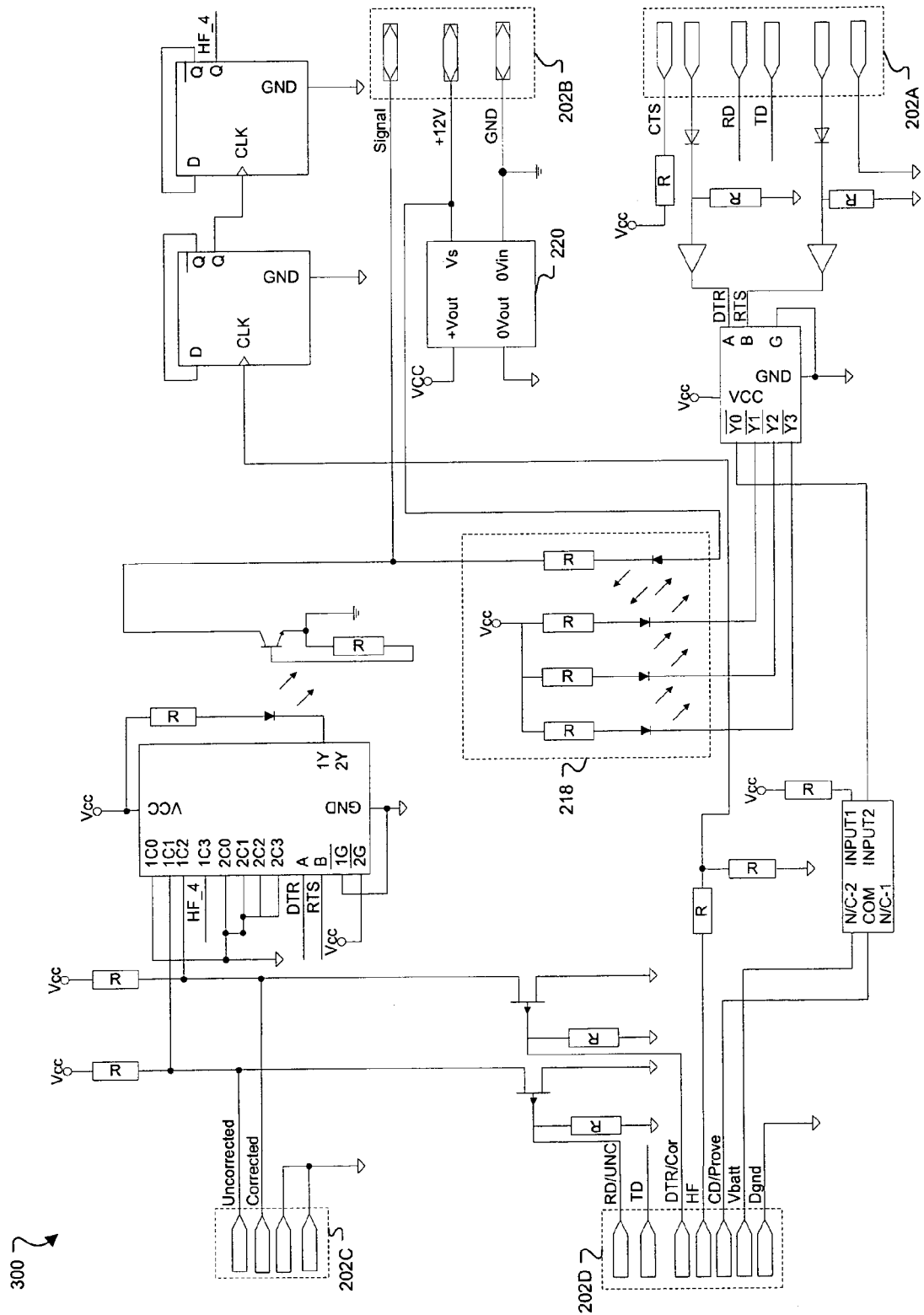
FIG. 3 shows an exemplary electrical schematic of the test interface.

FIG. 3 shows an exemplary electrical schematic 300 of the test interface 110. The test schematic 300 includes circuitry for the communication interface 202A to the computer device 108, the pulse interface 202B to the transfer prover 106, the pulse interface 202C to the meter/corrector 102, the communications interface 202D to the meter/corrector 102, the visual indicators 218, the power supply 220, and the switches 204A-C. In some embodiments, the test interface 110 may be implemented using digital or analog hardware, which may be discrete or integrated, or a combination thereof. The test interface 110 may include cables and connectors to connect the test interface 110 to the computer device 108, the transfer prover 106, and the meter/corrector 102 or the corrector 102B.

Figure 4A:
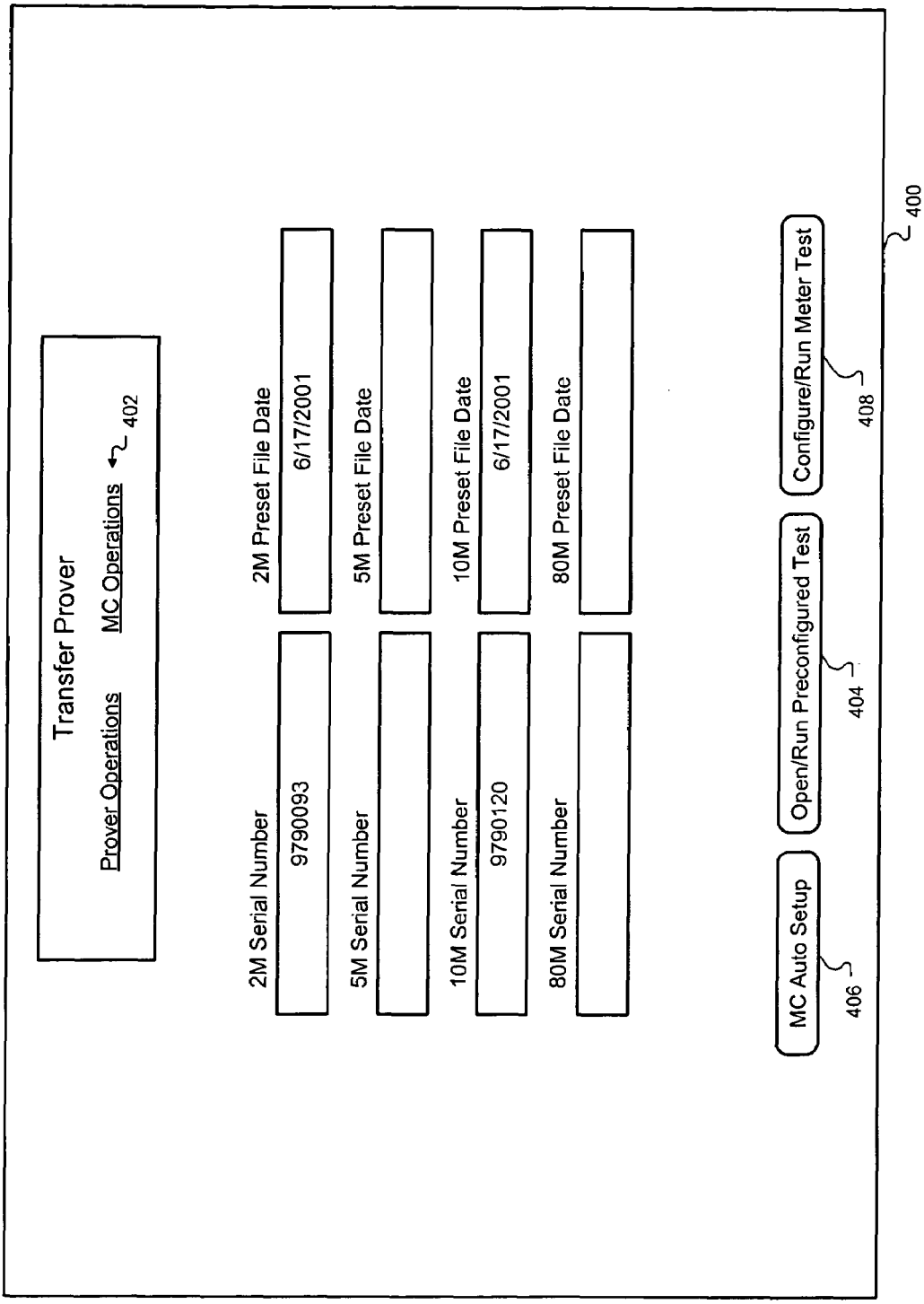
FIG. 4A shows an exemplary graphical user interface (GUI) that allows a user to control the testing of a gas meter and corrector.

FIG. 4A shows a graphical user interface (GUI) 400 that allows a user to perform fully automated combined accuracy testing of a gas meter and corrector either integrated or standard (i.e. non-integrated). The GUI 400 includes user selectable inputs, including Meter Corrector (MC) Operations 402, Open/Run Preconfigured Test 404, MC Auto Setup 406, and Configure/Run Meter Test 408. When the MC Operations 402 input is selected, the GUI 400 presents a second GUI, which is described in more detail with reference to FIG. 4B, and in which the user can select test configuration information used to perform an automated gas meter and volume corrector accuracy test procedure. When the Open/Run Preconfigured Test 404 input is selected, the software running on the computer device 108 loads a previously saved set of test configuration information. When the MC Auto Setup 406 input is selected, the software running on the computer device 108 retrieves settings from the meter/corrector 102 and the transfer prover 106, and a GUI, described in more detail with reference to FIG. 4C, displays the settings. Alternatively, when the Configure/Run Meter Test 408 input is selected, the GUI displays input controls where the user may select the settings for the meter/corrector 102 and the transfer prover 106.

Figure 4B:
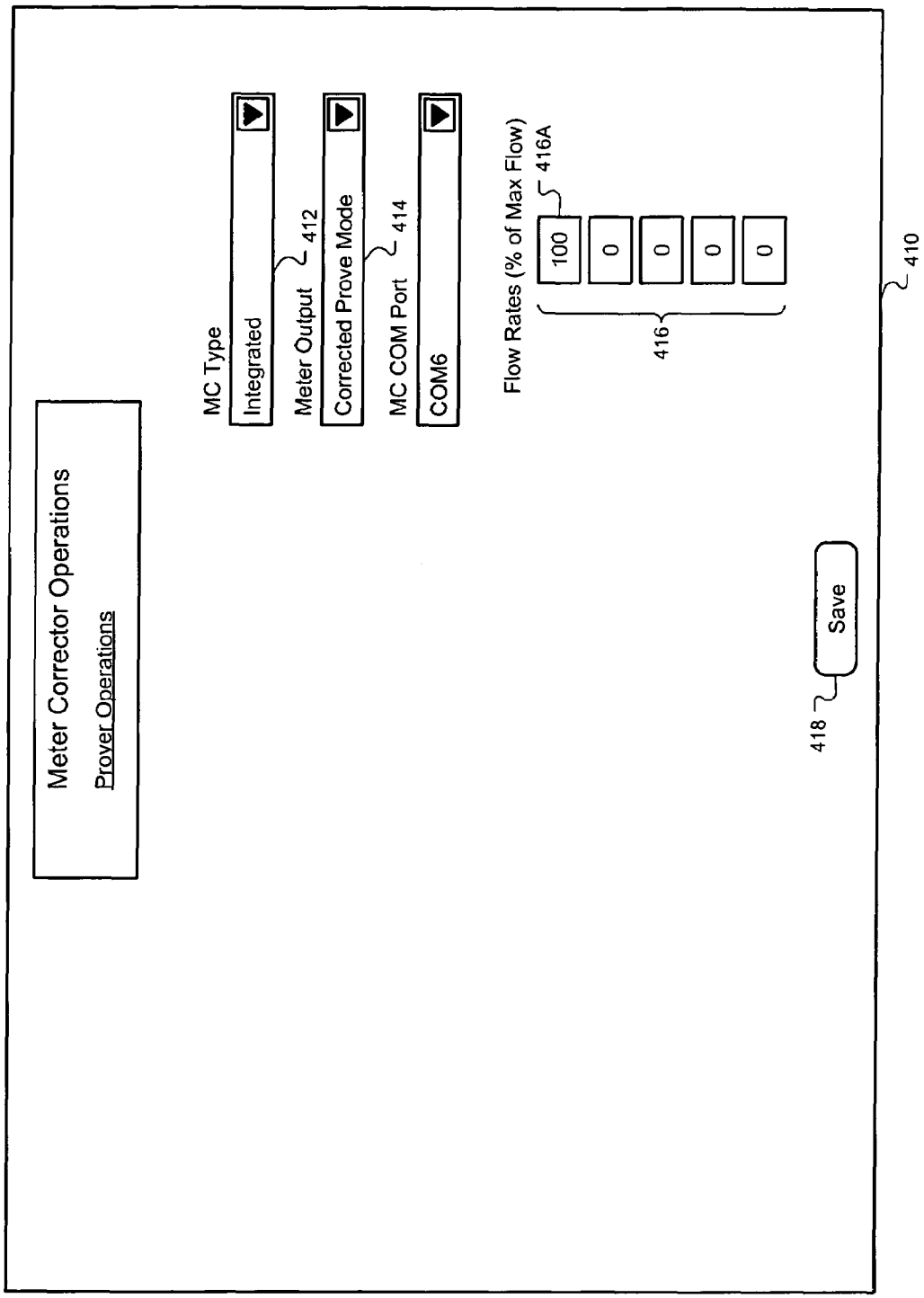
FIG. 4B shows an exemplary GUI that allows the user to input test parameters not automatically determined using the configuration of the gas meter, the corrector, and a transfer prover.

FIG. 4B shows an exemplary GUI 410 that allows the user to select a test configuration that may be used to perform an automated gas meter and volume corrector accuracy test procedure. The user may select a type of meter and corrector using an MC TYPE drop-down list 412. The list 412 has options of "Integrated," and "Not Integrated." The user may input a test type using a Meter Output drop-down list 414. The list 414 has options of "Corrected Normal Mode," "Uncorrected Normal Mode," "Corrected Proving Mode," "Uncorrected Proving Mode," and "High Frequency." The user may input flow rates, as a percentage of the maximum flow rate for the volume sensor 124, using the input control 416. The flow rates may be used in a series of tests of the meter/corrector 102. In this example, the user has entered a flow rate 416A, indicating that only one test should be executed for an integrated meter and corrector using corrected prove mode pulses. The test will be executed using 100 percent of the maximum flow rate of the meter/corrector 102. In other examples one or more consecutive tests may be conducted at one more flow rates, such as 5%, 10%, 30%, 50%, 75%, 90%, 110%, and/or 120%, for example, of the maximum flow rate of the meter/corrector 102. The selected test configuration settings may be stored for later use by selecting a Save button 418.

Figure 4C:
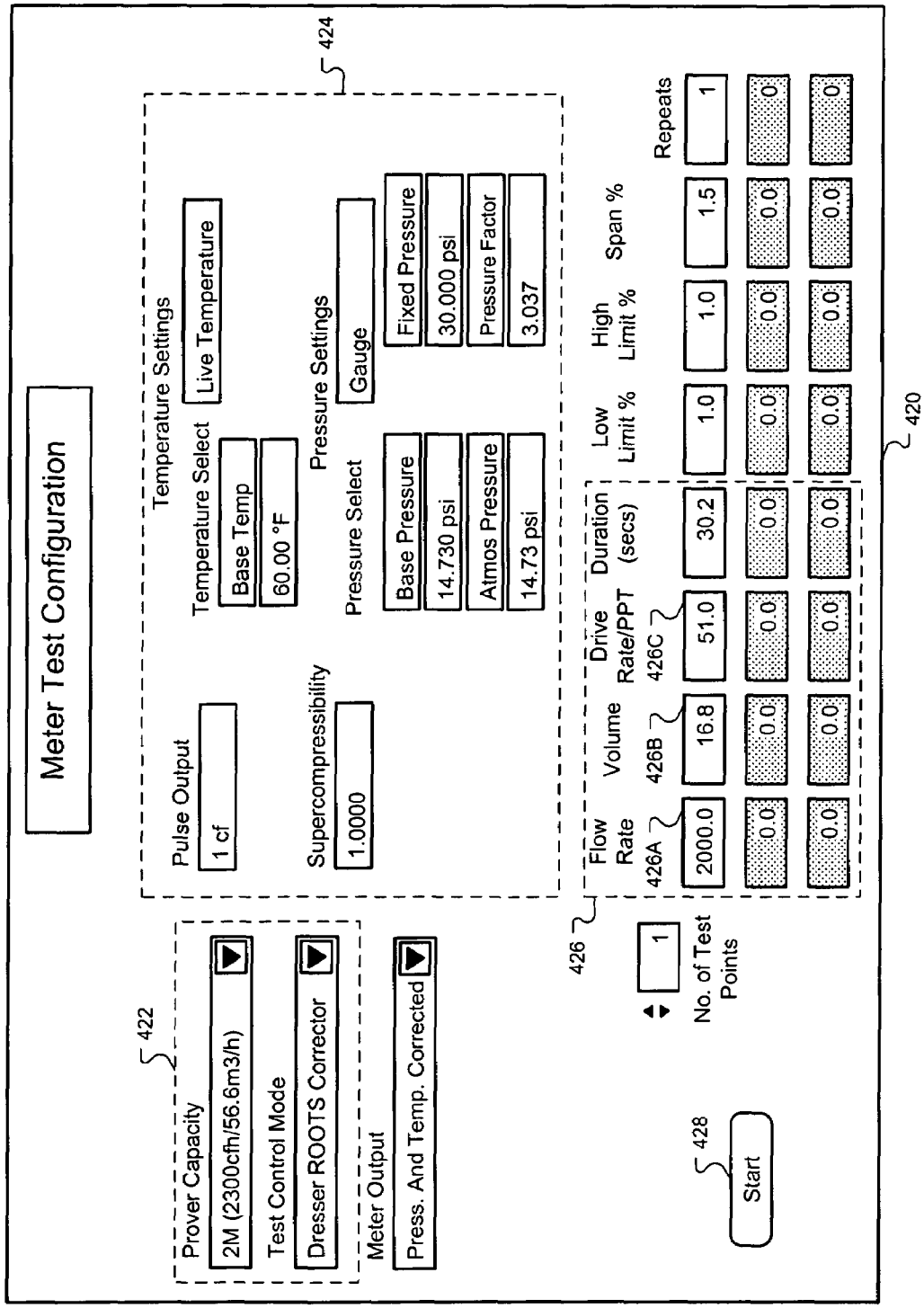
FIG. 4C shows an exemplary GUI that allows the user to review and edit test parameters automatically determined using the configuration of the gas meter, the corrector, and the transfer prover.

FIG. 4C shows an exemplary GUI 420 that allows the user to review and edit test parameters automatically determined using the configuration of the gas meter 102A, the corrector 102B, and the transfer prover 106. An area 422 within the GUI 420 displays parameters retrieved from the transfer prover 106, such as the transfer prover capacity and the test type (referred to as a Meter Output) that the user selected using list 414. An area 424 within the GUI 420 presents parameters retrieved from the meter/corrector 102, such as the temperature and pressure. An area 426 presents parameters calculated by the software running on the computer device 108, such as a flow rate 426A, a volume 426B, and a number of pulses per test 426C. The selected test may be initiated by selecting the Start button 428.

FIG. 4D shows an exemplary GUI 430 that presents results of the gas meter and corrector test to the user. The GUI 430 includes reference measurements 432 from the transfer prover 106 including the volume measured by the volume sensor 124, and the temperature measured by the temperature sensor 126. The GUI 430 also includes measurements 434 from the meter/corrector 102, such as the test volume measured at the volume sensor 112. The GUI 430 presents results of the tests in a results area 436, such as the percentage error between the volume measurements and whether, for example, the meter 102A and the corrector 102B, taken alone or in combination as a system, passed or failed the accuracy test. The user may request that the results of the test be displayed in a report form by selecting the View Report button 438.

FIG. 4E shows an exemplary GUI 440 that presents results of the gas meter and corrector test to the user. The GUI 440 shows data relating to the test, such as the parameters selected by the user, the parameters loaded from the transfer prover 106 and the meter/corrector 102, the values calculated by the software running on the computer device 108, the values measured by the transfer prover 106 and the meter/corrector 102, and the analysis of the test results.

Figure 5:
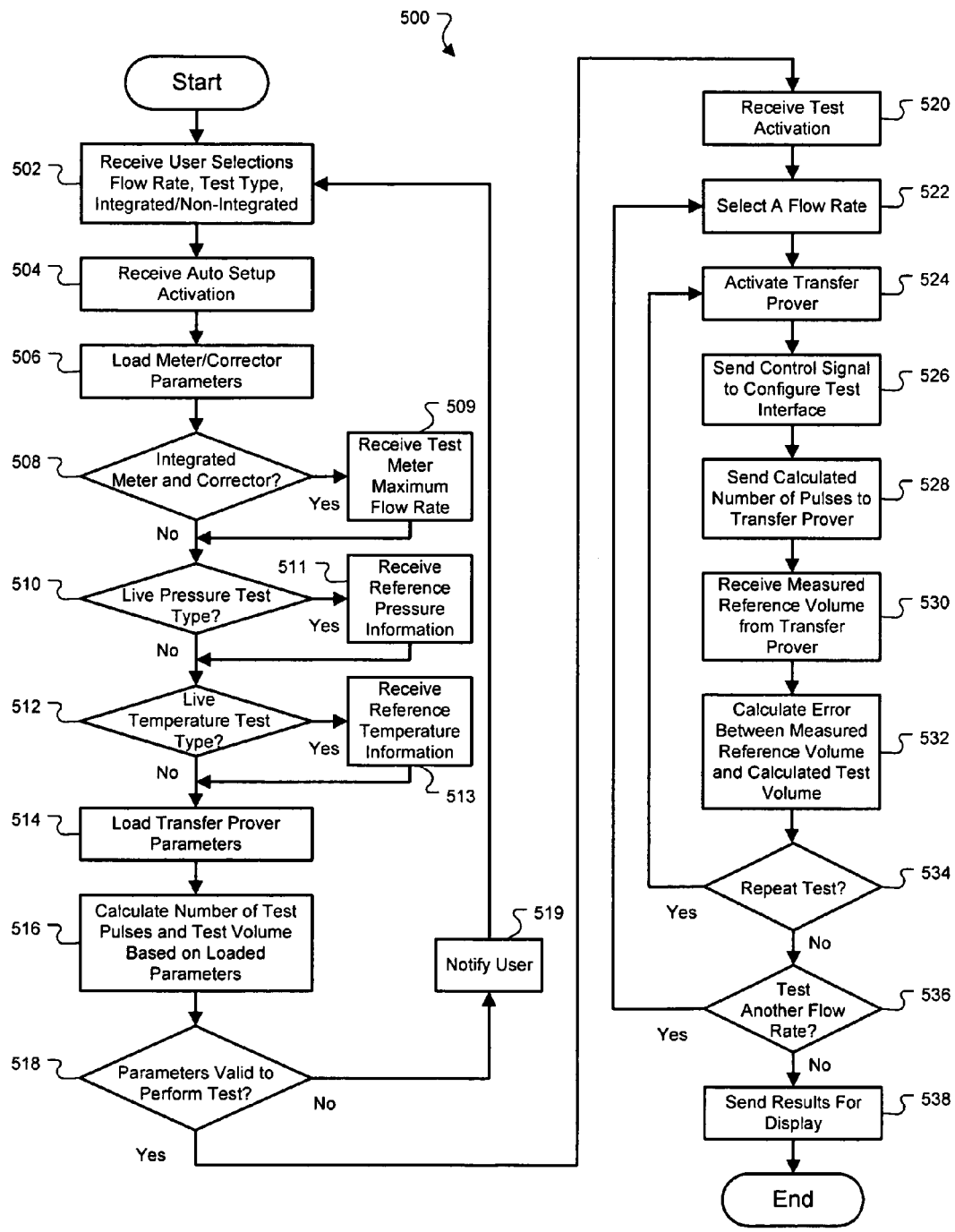
FIG. 5 shows a flow chart that illustrates an exemplary method of operations for testing a gas meter and corrector.

FIG. 5 shows a flow chart that illustrates an exemplary method 500 of operations for testing the gas meter 102A and the corrector 102B as well as the interface between the two. The method 500 includes operations that may be performed generally by the test setup 100. The operations may be performed under the control, supervision, and/or monitoring of the computer device 108. Operations may also be supplemented or augmented by other processing and/or control elements that may be incorporated by the test interface 110. Some or all of the operations may be performed by one or more processors executing instructions tangibly embodied in a signal. The processing may be implemented using analog and/or digital hardware or techniques, either alone or in cooperation with one or more processors executing instructions.

The method 500 begins at step 502 when the computer device 108 receives user selections, such as percentage flow rates, a test type to be performed, and a indication of whether the gas meter and corrector are integrated or not, as described with reference to FIG. 4B. At step 504, the computer device 108 receives an auto setup activation, such as by the user selecting the MC Auto Setup button 406. The computer device 108 loads, at step 506, parameters from the meter/corrector 102 via the test interface 110.

At step 508, if the meter and corrector are integrated, then at step 509 the computer device 108 receives maximum flow rate information for the meter under test. In one embodiment, the maximum flow rate information may be determined from information received via the test interface 110 and/or stored (i.e. look-up table) information about the meter, for example. At step 510, if the selected test uses live pressure correction, then, at step 511, the computer device 108 receives reference pressure information. At step 512, if the selected test uses live temperature correction, then at step 513, the computer device 108 receives reference temperature information. In various embodiments, the temperature and/or pressure information may be received by polling electronic temperature and/or pressure transducers, for example.

The computer device 108 loads, at step 514, parameters from the transfer prover 106. At step 516, the computer device 108 calculates the number of pulses per test 426C and the test volume 426B for the selected test configuration based on the loaded parameters and the received information.

If, at step 518, the parameters are not valid to perform the test, then a message is sent to notify the user of the error in step 519, and the step 502 is repeated. If the parameters are valid to perform the test, then the computer device 108 receives, at step 520, a test activation signal. In some embodiments this signal may be generated automatically or in response to selection of the Start button 428, for example.

At step 522, the computer device 108 selects a flow rate from among the flow rates selected at step 502. At step 524, the computer device 108 activates the transfer prover 106, which may prompt the transfer prover 106 to start the blower 122. The computer device 108 sends, at step 526, to the test interface 110 a control signal to configure the switches 204A-C to route the output pulse type selected at step 502. At step 528, the computer device 108 sends the calculated number of test pulses to the transfer prover 106. After the transfer prover 106 receives the calculated number of test pulses from the meter/corrector 102, the computer device 108 receives the reference volume measured by the transfer prover 106 at step 530. The computer device 108 calculates, at step 532, the error between the reference volume measured by the transfer prover 106 and the test volume measured by the meter/corrector 102.

The computer device 108 determines, at step 534, whether to repeat the test again. In some embodiments, each test may be repeated a predetermined number of times, or until a statistically meaningful result is achieved, for example. If the test does need to repeat, then the step 524 is performed. If the test does not need to repeat, then, at step 536, the computer device 108 determines whether there exists another flow rate from the flow rates selected at the step 502 that has not been tested. If there is another flow rate, then the step 522 is preformed. If there are not more flow rates, then the computer device 108 sends the test results for display at step 538, an example of which was described with reference to FIG. 4E.

FIG. 6A shows exemplary equations 600 for calculating, as described in step 516 above, a number of test pulses and a test volume using different test types. In this example, the number of pulses per test (PPT) 426C is calculated using the minimum test time, the test flow rate 426A, a pulse output value, and a correction factor. The correction factor is calculated using commonly known equations that incorporate the temperature, pressure, and supercompressibility of the material flowing through the line 104. The pulse output value is the volume of material that corresponds to one output pulse. The pulse output value converts pulse outputs to a volume measurement. The test volume 426B is calculated using the PPT 426C, the pulse output value, and the correction factor. For tests with no correction, the correction factor has a value of one. For the tests with correction, the correction factor will be a positive number.

FIG. 6B shows exemplary equations 650 for validating, as described in step 518 above, the pulse output and the drive rate using the different test types. According to this example, if the pulse output value is greater than the product of the test flow rate 426A, the correction factor, and the pulse width, then the meter/corrector 102 is capable of producing pulses fast enough to measure the test volume 426B. If the drive rate is greater than the product of the test flow rate 426A, the correction factor, and the pulse width, then the transfer prover 106 is capable of producing the test flow rate 426A. The correction factor, pulse output value, and pulse width vary depending on conditions, such as the temperature, the pressure, the supercompressibility, and the test type.

In some embodiments, the pulse rates and pulse widths may be assessed to ensure that the pulses will have sufficient separation to not overlap subsequent pulses. This type of check may be performed at step 518 of the method in FIG. 5, for example.

Although some embodiments of method have been described, other embodiments may perform the same or substantially similar steps in a different sequence, or a modified arrangement to achieve similar functions, which include automatically measuring the combined accuracy of a gas flow meter and a volume corrector using a transfer prover.

Although an exemplary system has been described with reference to FIG. 1, other implementations may be deployed in other processing applications, such as desktop and networked environments.

For example, implementations may include one or more wireless data links, such as between the test interface 110 and any of the computer device 108, the meter/corrector 102, and/or the transfer prover 106. Implementations may also include wireless data links between the computer device 108 and the meter/corrector 102, between the computer device and the transfer prover 106, and/or between the meter/corrector 102 and the transfer prover. In one implementation, the computer device 108 may have a data link with the meter/corrector 102 and with the transfer prover 106. During a test, the computer device 108 may relay information between the meter/corrector 102 and the transfer prover 106, for example.

Some systems may be implemented as a computer system that can be used with embodiments of the invention. For example, various embodiments may include digital and/or analog circuitry, computer hardware, firmware, software, or combinations thereof. Apparatus can be implemented in a computer program product tangibly embodied in an information carrier, e.g., in a machine-readable storage device or in a propagated signal, for execution by a programmable processor; and methods can be performed by a programmable processor executing a program of instructions to perform functions of the invention by operating on input data and generating an output. The invention can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some embodiments, each system 100 may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a handheld computer, laptop, desktop computer or a server.

In some embodiments, one or more user-interface features may be custom configured to perform specific functions. The invention may be implemented in a computer system that includes a graphical user interface and/or an Internet browser. To provide for interaction with a user, some embodiments may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various embodiments, the system 100 may communicate using suitable communication methods, equipment, and techniques. For example, the system 100 may communicate with compatible devices (e.g., devices capable of transferring data to and/or from the system 100) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other embodiments may transport messages by broadcasting to all or substantially all devices that are coupled together by a communication network, for example, by using omni-directional radio frequency (RF) signals. Still other embodiments may transport messages characterized by high directivity, such as RF signals transmitted using directional (i.e., narrow beam) antennas or infrared signals that may optionally be used with focusing optics. Still other embodiments are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A computer program product tangibly embodied in an computer readable medium, the product containing instructions that, when executed by a processor, cause the processor to perform operations to measure a combined accuracy of a gas volume meter and a gas volume corrector, the operations comprising:
    receive test flow rate information;
    receive test type information;
    receive parameter information about a meter under test (MUT) and an associated volume corrector (VC), the parameter information comprising a reference pressure above an ambient pressure;
    determine a reference volume of fluid to drive through the MUT such that combined accuracy of the MUT and the VC is measured by comparing the reference volume to a measurement by the MUT when the reference volume of fluid is driven through the MUT, the reference volume being determined based on the received flow rate, received test type, and received parameter information; and
    storing data to represent the measured accuracy in a data store for subsequent retrieval for display to a user.

2. A device to facilitate measurement of a combined accuracy of a gas meter and a volume corrector, the device comprising:
    a first data communication interface to receive a test volume measurement signal from a volume corrector (VC), the test volume measurement signal comprising an output signal generated in response to a test volume of gas flowing through a gas meter, the test volume measurement signal representing a test volume measurement corrected by the VC based on a reference pressure higher than an actual atmospheric pressure;
    a second data communication interface coupled to a reference volume measurement device to generate a reference volume measurement signal in response to the test volume of gas flowing through a reference volume sensor, the reference volume measurement signal representing a reference volume measurement of the test volume by the reference volume sensor; and
    a third data communication interface coupled to a processor to receive instructions that, when executed, cause the processor to perform operations to determine a combined accuracy of the gas meter and the VC based on a comparison of the test volume measurement and the reference volume measurement.

3. The device of claim 2, wherein the test volume measurement signal generated by the VC comprises a corrected volume measurement signal.

4. The device of claim 3, wherein the corrected volume measurement signal is corrected based on a signal from a first gas temperature sensor and a signal from a first gas pressure sensor.

5. The device of claim 4, wherein the reference volume measurement signal is corrected based on a signal from a second gas temperature sensor and a signal from a second gas pressure sensor.

6. The device of claim 2, wherein the reference volume sensor composes a calibrated volume sensor.

7. The device of claim 2, wherein the reference volume measurement device comprises a bell prover.

8. The device of claim 2, wherein the reference volume measurement device comprises a transfer prover.

9. The device of claim 2, further comprising a fourth data communication interface to receive an output signal from the meter.

10. The device of claim 2, further comprising means for routing signals in response to as least one control signal generated by the processor.

11. The device of claim 10, wherein the routing means is to controllably route one or more signals between two members selected from the group consisting of the first, second, and third communication interfaces.

12. The device of claim 2, wherein at least one of the first, second, and third communication interfaces comprises a wireless link.

13. The device of claim 2, wherein the VC is integrated with the meter.

14. The device of claim 2, wherein the meter comprises a rotary gas volume sensor.

15. A method to determine a combined accuracy of a gas flow meter and a volume corrector; the method comprising:
    identifying test volume measurement information to be sent from a volume corrector in response to a test volume of gas flowing through a gas meter coupled to the volume corrector, the test volume measurement information being corrected by the VC based on a reference pressure higher than an ambient pressure;
    receiving reference volume measurement information in response to the test volume of gas flowing through a reference volume sensor;
    determining a combined accuracy of the gas meter and the volume corrector based on a comparison of the test volume measurement information with the reference volume measurement information; and storing data to represent the determined combined accuracy in a data store for subsequent retrieval for display to a user.

16. The method of claim 15, wherein the test volume measurement information is corrected based on a signal from a first gas temperature sensor and a signal from a first gas pressure sensor.

17. The method of claim 16, wherein the reference volume measurement information is corrected based on a signal from a second gas temperature sensor and a signal from a second gas pressure sensor.

18. The method of claim 15, further comprising determining whether the combined accuracy fails within an acceptable range.

19. The method of claim 15, wherein the identified test volume measurement information comprises a number of pulses that, when received from the volume corrector, indicate that the test volume or gas has flowed through the gas meter.

20. The method of claim 19, further comprising sending the identified test volume measurement information to a reference volume measurement device that comprises the reference volume sensor.

* * * * *

UNITED STATES PATENT AND TRADEMARK OFFICE
CERTIFICATE OF CORRECTION

| | | |
|---|---|---|
| PATENT NO. | : 7,299,139 B2 | Page 1 of 1 |
| APPLICATION NO. | : 11/274470 | |
| DATED | : November 20, 2007 | |
| INVENTOR(S) | : Roman Leon Artiuch, Charles Grissom Steele and Miguel D. Gandara | |

It is certified that error appears in the above-identified patent and that said Letters Patent is hereby corrected as shown below:

Col. 1, Line 27 – replace "etc." with -- etc... --

Col. 3, Line 12 – replace "etc . . ." with -- etc... --

Col. 4, Line 67 – insert -- , -- after e.g.

Col. 14, Line 31 – replace "composes" with -- comprises --

Col. 14, Line 40 – replace "as" with -- at --

Col. 14, Line 54 – replace "corrector;" with -- corrector, --

Col. 15, Line 13 – replace "fails" with -- falls --

Col. 16, Line 4 – replace "or" with -- of --

Signed and Sealed this

Sixth Day of May, 2008

JON W. DUDAS
*Director of the United States Patent and Trademark Office*